A. HOERBURGER.
CHEESE STIRRING MACHINE.
APPLICATION FILED MAY 25, 1916.
1,248,327.
Patented Nov. 27, 1917.
2 SHEETS—SHEET 1.
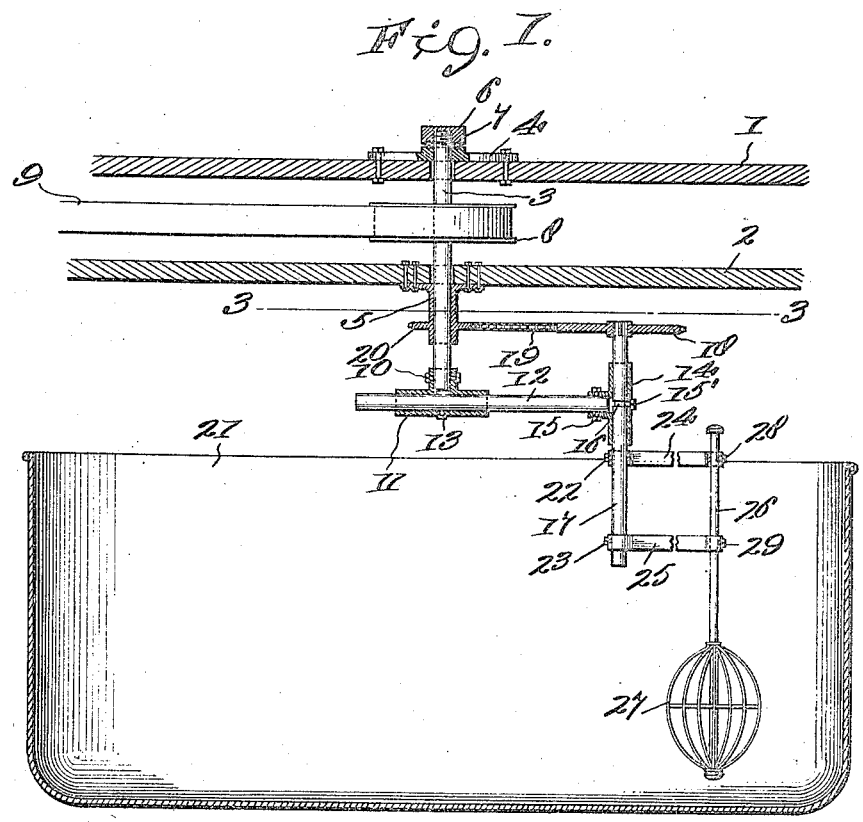
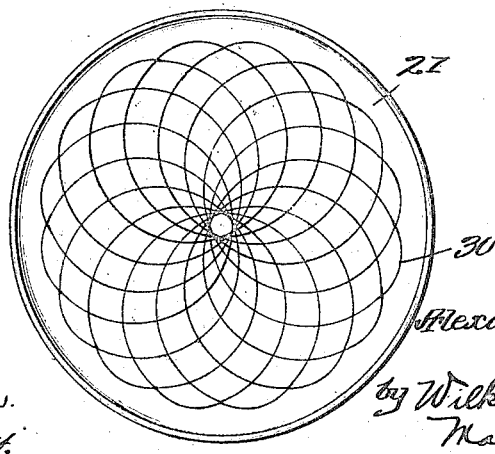
Witnesses
Edwin J. Beller
P. J. McWhinney
Inventor
Alexander Hoerburger
by Wilkinson, Ginsta & MacKaye
Attorneys

A. HOERBURGER.
CHEESE STIRRING MACHINE.
APPLICATION FILED MAY 25, 1916.

1,248,327.

Patented Nov. 27, 1917.
2 SHEETS—SHEET 2.

Witnesses
Edwin J. Beller
R. J. Mawhinney

Inventor
Alexander Hoerburger,
by Wilkinson, Guista & Mackaye.
Attorneys

UNITED STATES PATENT OFFICE.

ALEXANDER HOERBURGER, OF DARLINGTON, WISCONSIN.

CHEESE-STIRRING MACHINE.

1,248,327.

Specification of Letters Patent.

Patented Nov. 27, 1917.

Application filed May 25, 1916. Serial No. 99,893.

*To all whom it may concern:*

Be it known that I, ALEXANDER HOERBURGER, a subject of the German Emperor, residing at Darlington, in the county of Lafayette and State of Wisconsin, have invented certain new and useful Improvements in Cheese-Stirring Machines; and I do hereby declare the following to be a full, clear, and exact description of the invention, such as will enable others skilled in the art to which it appertains to make and use the same.

The present invention relates to improvements in cheese stirring machines, and has for an object to provide an improved cheese stirring machine wherein a double motion of revolution will be superimposed on the stirring device to bring the same into contact with the curd in all parts of the kettle.

Another object of the present invention resides in providing an improved cheese stirring machine in which the stirring device will be carried on a secondary shaft and adjustably supported to bring the same at any required position in the cheese kettle, such secondary shaft being supported to be rotated from a main shaft by an adjustable arm which provides for extending the stirring device to fit vessels of varying size.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a vertical sectional view through a kettle illustrating the improved stirring mechanism as applied thereto, parts shown in section and in elevation.

Fig. 2 is a diminished plan view of the kettle indicating diagrammatically the path taken by the stirring device.

Figure 3:
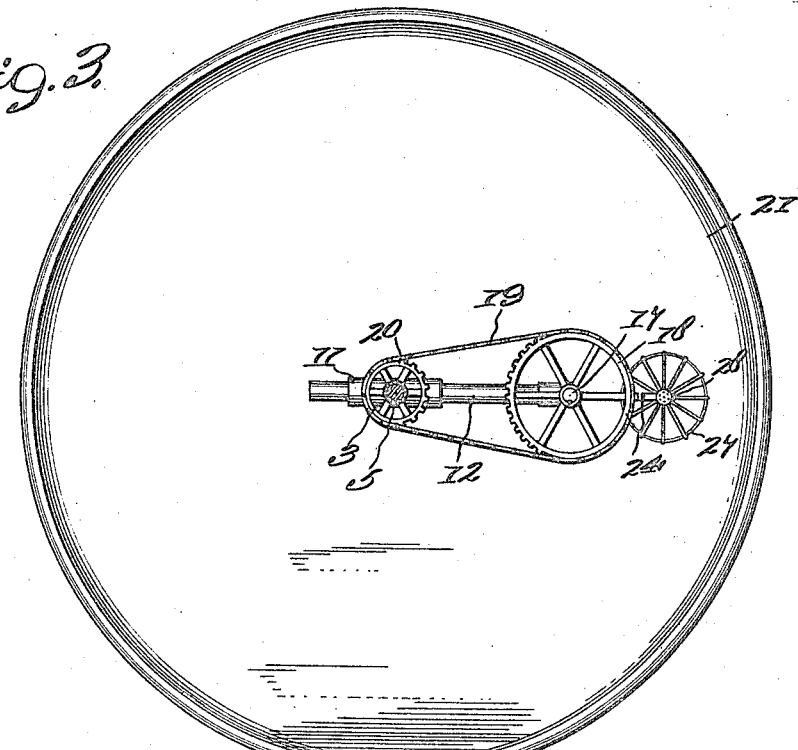
Fig. 3 is a sectional view taken on the line 3—3 in Fig. 1.
Figure 4:
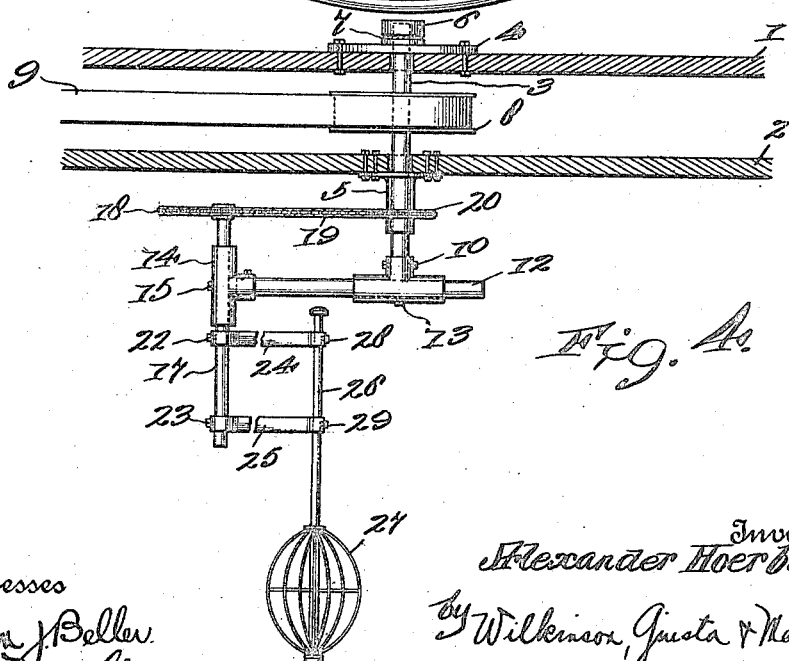
Fig. 4 is an elevational view with the frame members shown in section, and showing the device as moved through 180° with reference to Fig. 1.

Referring more particularly to the drawings, 1 and 2 designate frame members perforated to receive a main shaft 3, which is disposed vertically therethrough and journaled to rotate in a bearing plate 4 secured to the upper member 1 and through a bearing sleeve 5 bolted or otherwise secured beneath the lower frame member 2, as clearly indicated in Figs. 1 and 4.

The main shaft 3 is threaded at its upper end to receive a cap 6, between which and the bearing plate 4 are formed complementary races in which run ball bearings 7. A pulley 8, or other equivalent element, is mounted on the shaft 3, and such shaft may be rotated from any suitable source of power by a belt 9.

Carried on the lower end of the main shaft 3 is a bracket comprising a horizontally-extending sleeve 11, an arm 12 slidably received into said sleeve, and a vertically-disposed sleeve 14 held on the outer free end of said arm 12. The sleeve 11 may be secured to the main shaft 3 in any suitable manner, as by the set screws 10 shown; and set screws 15 may also be provided to secure the sleeve 14 to the arm 12; it being understood that such other means may be employed as will effect the rotation of the bracket about the axis of the main shaft 3, when the latter is driven, carrying therewith the vertically-disposed sleeve 14. The arm 12 has a suitable adjustment in the sleeve 11 through the set screw 13, or other means, and its position may be varied to correspond to varying sizes of kettles. Journaled to rotate in the vertically disposed sleeve 14, and held to position therein by a set screw 15′ having its inner end occupying an annular depression 16, is a secondary shaft 17. A sprocket 18 is fitted to the upper end of the secondary shaft 17, and is connected by a chain 19 with a second sprocket 20 fixed to the bearing sleeve 5. Through such sprocket and chain gearing rotation is imparted to the secondary shaft 17 when the main shaft 3 is rotated to carry the device as a whole around within the kettle or vat, which is indicated at 21. To secure the best results this kettle or vat 21 is preferably cylindrical, and may be stationary; it being supported with reference to the machine advantageously in the manner shown in Fig. 1, wherein the main shaft 3 is central of said kettle or vat.

Adjustably fitted to the secondary shaft 17, as by means of set screws 22 and 23, are arms 24 and 25 constructed at their outer ends into eyes or bearings to slidably and adjustably receive a rod 26 supporting a stirring device or beaters 27 of any suitable construction. There are set screws 28 and 29 for holding the rod 26 in the adjusted position to support the stirring device or beaters 27 at the required elevation in the kettle or vat 21. A limited adjustment for this purpose may also be had through the manipulation of the set screws 22 and 23 which support the arms 24 and 25 from the secondary shaft 17.

The device operates in the following manner:

When power is applied through the belt 9 to the pulley 8, the main shaft 3 is thereby rotated to carry the device as a whole around within the kettle or vat 21, for which compare Figs. 1 and 4.

Simultaneously with this motion of revolution imparted to the stirring device or beaters 27, a second minor motion of revolution is superimposed thereon by rotation of the secondary shaft 17 through the sprockets 18 and 20 and chain 19. For a graphic representation of the combined motions executed by the stirring device or beaters 27, attention is invited to Fig. 2 of the drawings wherein 30 designates the path described by the axis of such stirring device; it being entirely clear from this figure that during the progress of the stirring device or beaters 27 in a circular path about the kettle 21, due to the movement of the main shaft 3, the device is simultaneously compelled to travel in a series of minor circular paths, due to the rotation of the shaft 17, which is effective to carry the same into all parts of the kettle or vat 21.

It will be appreciated that for kettles of larger dimension than that shown in the drawings, the arm 12 may be extended by loosening the set screw 13, and the stirring device 27 may thereby be given a greater radius of movement suitable to the increased size of the kettle; similarly, the desired vertical adjustment of the device 27 may be effected through various set screws associated with the arms 24 and 25, as above described.

A successfully operating device has been constructed providing the sprocket 20 on the bearing sleeve 5 with thirteen teeth, while the larger sprocket 18 on the shaft 17 is formed with forty-two teeth, thus compelling the stirring device 27 to execute a large number of circular movements about the secondary shaft 17 through every complete rotation of the main shaft 3.

It is obvious that those skilled in the art may vary the details of construction and arrangements of parts without departing from the spirit of my invention, and therefore I do not wish to be limited to such features except as may be required by the claims.

I claim:

1. In a cheese stirring machine, the combination of a frame, a main shaft journaled in said frame, means for rotating said main shaft, a rotating secondary shaft supported to revolve about said main shaft, means for adjusting said secondary shaft toward or from said main shaft, and a stirring device carried by said secondary shaft, substantially as described.

2. In a cheese stirring machine, the combination of frame members, a main shaft journaled in said frame members, means for rotating said main shaft, a secondary shaft supported to revolve about said main shaft, means for rotating said secondary shaft when revolved, arms adjustably carried on said secondary shaft, and a stirring device adjustably supported in said arms to revolve about said secondary shaft, substantially as described.

3. In a cheese stirring machine, the combination of a frame, a main shaft journaled in said frame, means for rotating said main shaft, a sleeve carried on said main shaft, an arm adjustable through said sleeve, a secondary shaft supported on said arm to revolve about said main shaft, means for rotating said secondary shaft when revolved, and a stirring device supported from said secondary shaft, substantially as described.

4. In a cheese stirring machine, the combination of frame members, a main shaft journaled in said frame members, means for rotating said main shaft, a sleeve carried on said main shaft, an arm adjustably received into said sleeve, a secondary shaft supported on said arm to revolve about said main shaft, gearing for rotating said secondary shaft when revolved, and a stirring device carried to revolve about said secondary shaft, substantially as described.

5. In a cheese stirring machine, the combination of frame members, a main shaft journaled in said frame members, means for rotating said main shaft, a sleeve carried on said main shaft, an arm received in said sleeve, a second sleeve supported on said arm, a secondary shaft journaled to rotate in said second sleeve and to revolve about said main shaft, means for imparting rotation to said secondary shaft when revolved, and a stirring device carried by said secondary shaft, substantially as described.

6. In a cheese stirring machine, the combination of frame members, a main shaft journaled in said frame members, means for rotating said main shaft, a sleeve carried on said main shaft, an arm mounted through said sleeve, a secondary shaft supported on said arm to revolve about said main shaft, sprocket and chain gearing for rotating said secondary shaft when the same is revolved about said main shaft, adjustable arms carried on said secondary shaft, and a stirring device adjustably carried in said arms and arranged to revolve about said secondary shaft, substantially as described.

7. In a cheese stirring machine, the combination of frame members, a main shaft journaled in said frame members, means for rotating said main shaft, a sleeve supported to rotate with said main shaft, an arm mounted through said sleeve, a second sleeve carried on said arm, a secondary shaft journaled to rotate in said second sleeve and to revolve about said main shaft, a sprocket on said secondary shaft, a second fixed sprocket supported from one of the frame members, a chain connecting said sprockets to rotate said secondary shaft when revolved, arms adjustably supported from said secondary shaft, and a stirring device adjustably supported from said arms and arranged to revolve about said secondary shaft, substantially as described.

8. In a cheese stirring machine, the combination of a frame, a main shaft journaled in said frame, means for rotating said main shaft, a bracket supported to move with said main shaft and including a sleeve connected to the main shaft, an arm slidable through said sleeve, means for holding said arm in adjusted position in said sleeve, a second sleeve connected to the outer end of said arm and disposed angularly to said first named sleeve, a secondary shaft journaled to rotate in said second sleeve, gearing for rotating said secondary shaft when the same together with said bracket is revolved about said main shaft, and a stirring device adjustable relatively to said secondary shaft and supported to revolve thereabout, substantially as described.

9. In a cheese stirring machine, the combination of a frame, a main shaft journaled in said frame, means for rotating said main shaft, a bracket revolving about said main shaft and including a sleeve connected to rotate with said main shaft, an arm slidable through said sleeve, means for securing said arm in any adjusted position in said sleeve, and a second sleeve on the outer end of said arm, a secondary shaft journaled to rotate in said second sleeve, chain and sprocket gearing for rotating said secondary shaft when the bracket is revolved about said main shaft, arms fitted over said secondary shaft and adjustable relatively thereon, a rod adjustably carried in the outer ends of said arms, and a stirring device on said rod for revolving about said secondary shaft, substantially as described.

In testimony whereof, I affix my signature.

ALEXANDER HOERBURGER.

Copies of this patent may be obtained for five cents each, by addressing the "Commissioner of Patents, Washington, D. C."